United States Patent [19]

Germer

[11] Patent Number: 4,678,626
[45] Date of Patent: Jul. 7, 1987

[54] RADIANT VESSEL AUXILIARY COOLING SYSTEM

[75] Inventor: John H. Germer, San Jose, Calif.

[73] Assignee: General Electric Company, San Jose, Calif.

[21] Appl. No.: 803,353

[22] Filed: Dec. 2, 1985

[51] Int. Cl.$^4$ .............................................. G21C 15/18
[52] U.S. Cl. ................................... 376/298; 376/293; 376/299
[58] Field of Search ............... 376/295, 296, 298, 299, 376/293

[56] References Cited

U.S. PATENT DOCUMENTS

| | | | |
|---|---|---|---|
| 4,061,534 | 12/1977 | Jackson | 376/298 |
| 4,464,334 | 8/1984 | Artaud et al. | 376/298 |
| 4,508,677 | 4/1985 | Craig et al. | |

FOREIGN PATENT DOCUMENTS

| | | | |
|---|---|---|---|
| 1526536 | 5/1968 | France | 376/298 |
| 2506063 | 11/1982 | France | 376/295 |
| 1412764 | 11/1975 | United Kingdom | 376/298 |

OTHER PUBLICATIONS

Neylan, The Multicavity PCRV, Nuclear Engineering International, Aug. 1974, pp. 652-655.

*Primary Examiner*—Deborah L. Kyle
*Assistant Examiner*—Richard W. Wendtland
*Attorney, Agent, or Firm*—Ivor J. James, Jr.; Raymond G. Simkins

[57] ABSTRACT

In a modular liquid-metal pool breeder reactor, a radiant vessel auxiliary cooling system is disclosed for removing the residual heat resulting from the shutdown of a reactor by a completely passive heat transfer system. A shell surrounds the reactor and containment vessel, separated from the containment vessel by an air passage. Natural circulation of air is provided by air vents at the lower and upper ends of the shell. Longitudinal, radial and inwardly extending fins extend from the shell into the air passage. The fins are heated by radiation from the containment vessel and convect the heat to the circulating air. Residual heat from the primary reactor vessel is transmitted from the reactor vessel through an inert gas plenum to a guard or containment vessel designed to contain any leaking coolant. The containment vessel is conventional and is surrounded by the shell.

5 Claims, 5 Drawing Figures

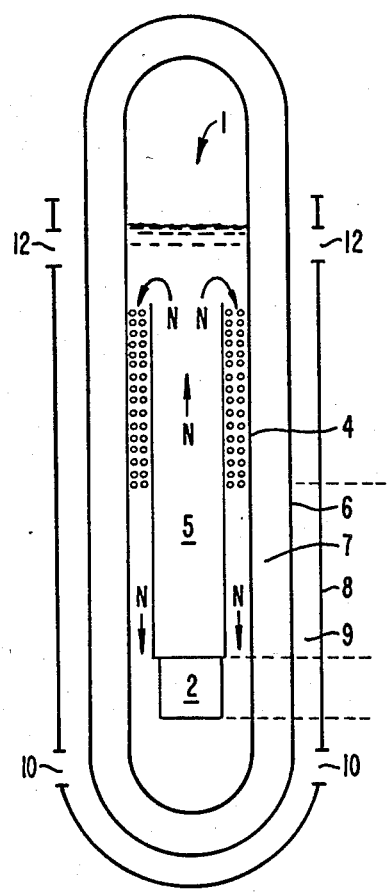
FIG._1.
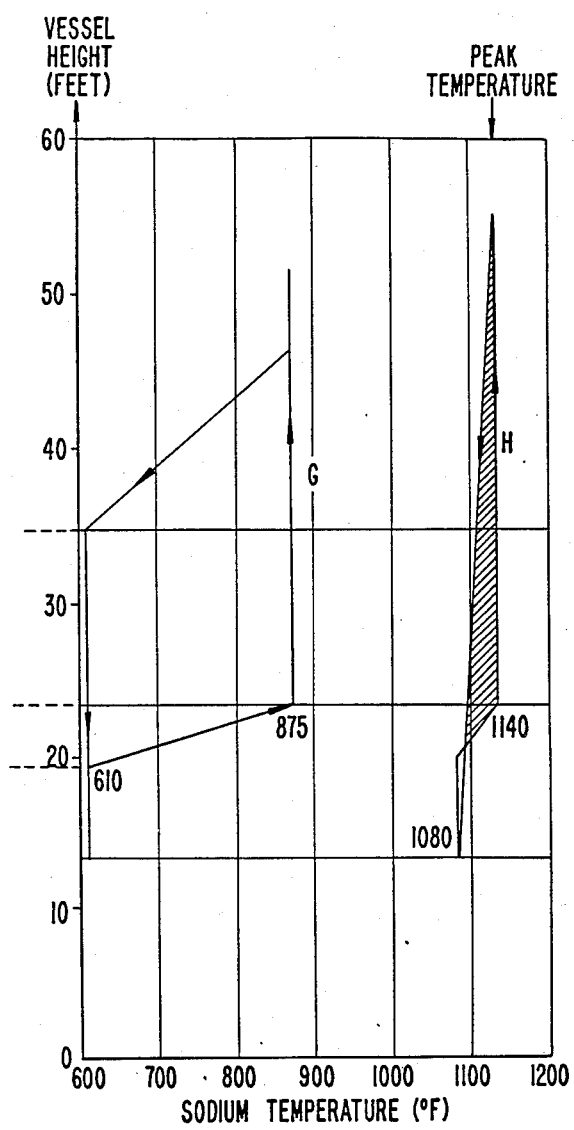
FIG._2.

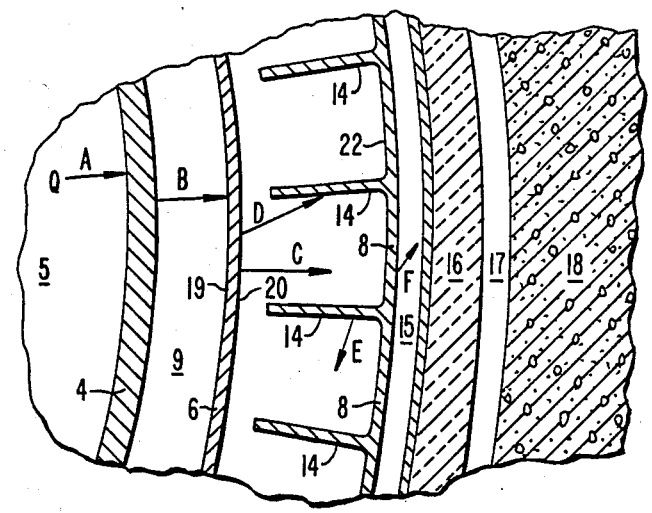
FIG._3.
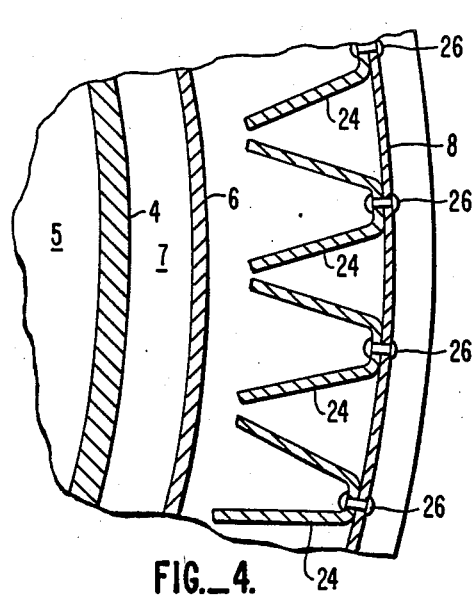
FIG._4.
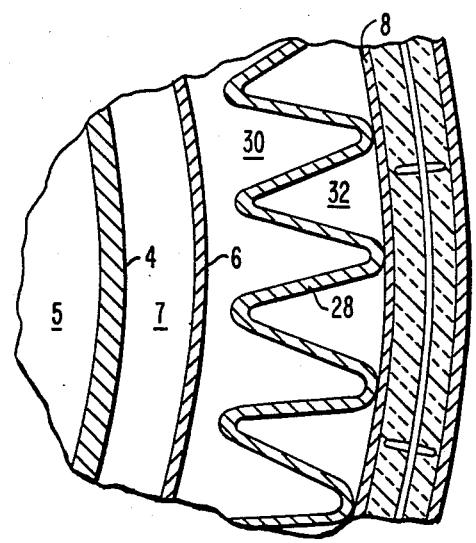
FIG._5.

RADIANT VESSEL AUXILIARY COOLING SYSTEM

The Government of the United States has rights in this invention under Contract No. DE-AT03-83SF11699 in 24BR04755.

BACKGROUND OF THE INVENTION

1. Field of the Invention

The present invention relates to an improved radiant vessel passive cooling system for modular liquid-metal cooled pool-type nuclear reactors such as the type disclosed in U.S. Pat. No. 4,508,677 to Craig et al.

In the event of an emergency during the operation of a sodium or sodium-potassium cooled nuclear power plant, it is sometimes necessary to shut down the fission reaction of the reactor core. To accomplish the "shutdown," the control rods are fully inserted between the fuel assembly rods in the reactor core to absorb neutrons. However, a significant amount of heat continues to be produced by the fission products. It is necessary that the structures surrounding the reactor be capable of dissipating such residual heat without incurring any structural damage. The heat capacity of the coolant and the overall structure aids in dissipating the residual heat. The materials from which the surrounding structures are constructed may not be able to safely withstand high temperatures. For instance, thick concrete walls typically are used as part of the containment housing for a nuclear reactor. However, concrete cannot be relied upon to withstand high temperatures since concrete begins to splay and crack under high temperature conditions. An auxiliary cooling system to safely remove the heat from the reactor structure during a shutdown is necessary.

2. Description of the Related Art

Conventional nuclear reactors have utilized a variety of elaborate energy driven cooling systems to dissipate heat from the reactor. In many of the situations warranting a shutdown, the energy supply to the cooling systems makes the cooling systems themselves subject to failure. For example, pumps and ventilation systems to cool the core may fail. Furthermore, if operator intervention is necessary, there are foreseeable scenarios in which the operator would be unable to provide the appropriate action. The most reliable and desirable cooling system would be a completely passive system which could continuously remove the residual heat generated after shutdown.

For modular liquid-metal cooled reactors such as the type disclosed in U.S. Pat. No. 4,508,677, which produces on the order of 200-500 Megawatts (thermal), utilizing sodium or sodium-potassium as the coolant provides numerous advantages. Water cooled reactors operate at or near the boiling point of water. Any significant rise in temperature results in the generation of steam and increased pressure. By contrast, sodium or sodium-potassium has an extremely high boiling point, in the range of 1800 degrees Fahrenheit at one atmosphere pressure. The normal operating temperature of the reactor is in the range of about 900 degrees Fahrenheit. Because of the high boiling point of the liquid metal, the pressure problems associated with water cooled reactors and the steam generated thereby are eliminated. The heat capacity of the liquid metal permits the sodium or sodium-potassium to be heated several hundred degrees Fahrenheit without danger of materials failure in the reactor.

The reactor vessels for pool-type liquid-metal cooled reactors are essentially smooth, sealed cups without any perforations to interrupt the integrity of the vessel walls. This sealing is essential to prevent the leakage of liquid metal from the primary vessel. The vessel surfaces must also be accessible for the rigorous inspections required by safety considerations.

In the typical sodium cooled reactor, two levels of sodium loops are used. Usually, a single primary loop and two or more secondary loops are used. The primary loop contains very radioactive sodium which is heated by the fuel rods. The primary loop passes through heat exchangers to exchange the heat with one of the non-radioactive secondary sodium loops. In general, sodium cooled reactors are designed to incorporate redundant secondary loops in the event of failure of one loop.

Upon shutdown of the reactor by fully inserting the control rods, residual heat continues to be produced and dissipated according to the heat capacity of the plant. Assuming that the reactor has been at full power for a long period of time, during the first hour following shutdown, an average of about 2% of full power continues to be generated. The residual heat produced continues to decay with time.

SUMMARY OF THE INVENTION

Residual heat generated during reactor shutdown of a modular liquid-metal cooled reactor is passively dissipated in a shell provided to surround the reactor and containment vessels. Longitudinal radial fins directed inwardly from the walls of the shell complete the completely passive heat removal system. The fins of the shell extend the surface area available to capture heat radiating from the containment vessel surfaces. Ambient air is naturally circulated upwardly via vents in the shell through the gap between the containment vessel and the finned shell. The fins convect heat to the circulating air, thus cooling the shell and fins. As a result of this convection, the temperature difference between the containment and the shell increases. This temperature difference enhances the radiation from the containment vessel to the shell, since radiation continues as long as the containment vessel "sees" a lower temperature body. In effect, this temperature difference is the driving force in the process of dissipating residual heat from the reactor vessel.

In the event of a reactor shutdown, after the control rods are fully inserted, the heat generated by the fuel rods is transferred through the reactor vessel, across an inert gas gap to the surrounding containment vessel primarily by thermal radiation, with a small fraction of the heat transferred by conduction and convection in the contained inert gas. Surfaces of high thermal emissivity provided on the outside of the reactor vessel and the interior of the containment vessel increase the efficiency of the heat transfer.

Heat is then removed from the outside surface of the containment vessel partly by thermal radiation and partly by direct convection to the circulating air in the passage between the containment vessel and the shield. Modular reactor vessels have approximately one third the diameter and are about the same height as conventional nuclear reactor vessels. In modular reactors, the ratio of the surface area to the power generated is approximately three times greater than the surface area to power ratio in a conventional and large reactor. This provides sufficient surface area over which the residual heat may be passively dissipated. The highly emissive exterior surfaces of the containment vessel also enhance the heat transfer. Thus, the present invention eliminates the necessity of redundant secondary sodium loops. A single secondary loop can function safely with the passive auxiliary cooling system as the alternative cooling mechanism.

BRIEF DESCRIPTION OF THE FIGURES

FIG. 1 is a schematic illustration of the reactor vessel, containment vessel and shell.

FIG. 2 is a graphic representation of the temperature distribution of the sodium as a function of reactor height.

FIG. 3 is a schematic cross-sectional illustration of the heat transfer paths through the reactor vessel, containment vessel and shell.

FIG. 4 is a cross-sectional view of attachable surface area extenders.

FIG. 5 is a cross-sectional view of a corrugated surface area extension insert.

DETAILED DESCRIPTION OF THE EMBODIMENT

Modular pool-type liquid-metal cooled reactors have sufficient surface area to accommodate dissipation of residual heat during reactor shutdown events. Overall, the reactor system has a relatively small heat capacity. The problem remaining is to dissipate the residual heat without significantly damaging the containment structures. A completely passive cooling system eliminates reliance on energy driven pumps and fans and the need for operator intervention. At the same time, the containment vessel itself must not be structurally modified due to the size constraints on modular reactors, and the necessity of a smooth, unperforated cup structure to prevent any areas where stresses might accumulate. Strict inspection requirements also require that the containment vessel be simple to inspect both during manufacture and erection of the structure.

FIG. 1 is a schematic illustration of the arrangement of the auxiliary cooling system in the housing 1 of a modular pool-type sodium cooled breeder reactor. The fuel rods and reactor core 2 are completely contained by the generally spherical ended cylindrical reactor vessel 4. Ideally, the reactor vessel 4 is a simple cup which has its only penetrations at the top. Any violations of the integrity of the vessel 4 present potential leaks for the radioactive coolant 5, typically liquid sodium.

To contain any possible coolant leaks, the reactor vessel 4 is surrounded, at least up to the level of coolant, by a somewhat larger diameter containment vessel 6. As with the reactor vessel, the containment vessel structure is an uninterrupted vessel without orifices to provide potential leakage paths for coolant to escape. The interstitial region 7 between the reactor vessel 4 and the containment vessel 6 is generally evacuated and filled with an inert gas. The inert gas prevents reactions between leaking sodium and oxygen which cause sodium fires. Separated from the containment vessel 6 by a circulatory air space 9 is a shell 8 which has an air inlet 10 at the lower end of the housing and an air outlet 12 near the upper end of the housing 1. Referring to FIG. 3, the shell 8 has internal surface area extenders, which in the preferred embodiment, are circumferentially spaced radially extending longitudinal fins 14. Surrounding the shell 8 is another relatively narrow air gap 15, which is followed by a layer of insulation material 16, another narrow air gap 17 and a thick concrete wall 18.

FIG. 2 is juxtaposed with the schematic of FIG. 1 to graphically illustrate the sodium temperature as a function of height along the reactor vessel. The curve designated G represents normal operating conditions.

During normal operation, "cool" sodium is about 610° F. Referring to curve G, as the cool sodium is heated by the core, its temperature rises to about 875° F. This heated sodium rises along the vessel sodium loop as indicated by the arrows N in FIG. 1, to pass through heat exchangers (not illustrated). The heat exchangers exchange heat from the primary sodium loop to the secondary loop, cooling the primary coolant from 875° F. to about 610° F.

A shutdown event occurs. The control rods are fully inserted, absorbing the majority of the neutrons. For about an hour, an average of about 2% of full power is being generated. This decays over time as the fission product decay decreases. The overall heat capacity of the system absorbs some of the residual heat, warming the sodium. Assuming the complete failure of all pumps, natural convection circulates the sodium within the pool. At about 1080° F., curve H then comes into play. As the sodium passes the core, it heats up to about 1140° F. This sodium passes upwardly and cools on the inner surface of the vessel by heat exchange through the reactor vessel, containment vessel and shells back to about 1080° F. The area within curve H represents the natural pumping action of the induced convection.

A more detailed illustration of the preferred embodiment of the cooling system is provided in the cross-sectional view in FIG. 3. The flow path of the heat from the reactor vessel 4 during a shutdown event is illutrated schematically through the various layers of the housing 1. To maximize the efficiency of the heat transfer, the outer surface of the reactor vessel 4, the inner surface 19 of the containment vessel 6, its outer surface 20, the inner fin surfaces 14 and the inner surface 22 of the shell 8 are assumed to be provided with highly thermally-emissive and/or absorptive surfaces.

Heat Q generated by the fission products of the core is conducted from the sodium coolant 5 through the reactor vessel wall 4 as indicated by arrow A. The outer surface of the reactor vessel wall transmits the heat across the air space 9 primarily by radiation to the inner surface 19 of the containment vessel 6 as indicated by arrow B. If sodium were to leak into the air space 9, the sodium would improve conductive heat transfer to the containment vessel 6. This heat is then conducted through the thickness of the containment wall to the outer containment wall surface 20. Naturally circulating air travels across the containment wall surface 20 to convect away much of the absorbed heat, this indicated by arrow C. The outer containment wall surface 20 also radiates to the lower temperature interior surfaces of the shell 8 and its associated longitudinal fins 14 as indicated by arrow D. The fins 14 then convect to the circulating air as indicated by the arrow E. The surface area extension of the fins 14 absorb the radiated heat and provide additional surface area from which residual heat can be convected to the circulating ambient air. The convection cools the fins, which drives the radiation to continue from the containment vessel 6 to the shell 8. A minimal amount of heat (arrow F) is eventually conducted through the shell walls 8 to the insulation 16 to be dissipated to air in auxiliary cooling gap 17 to prevent overheating of the concrete wall 18.

Alternative embodiments for the fins as surface area extensions are illustrated in the cross-sectional views of FIGS. 4 and 5. In FIG. 4, the shell 8 is simply a smooth-walled cylinder surrounding the containment vessel 6. Longitudinal surface area extenders are attached to the shell 8. The surface area extenders are generally V-shaped channel strips 24 having a flattened center portion at their apex, by which attachments 26 secure the channel strips 20 to the shell 8.

FIG. 5 illustrates an embodiment in which a corrugated insert 28 acts as the surface area extensions. The corrugated insert 28 is an accordion pleated strip installed between the containment vessel 6 and the shell 8, forming two separate air streams—an inner air stream 30 and an outer air stream 32—to which the corrugated insert 28 can convect away heat.

While the above provides a full and complete disclosure of the preferred embodiments of the invention, various modifications, alternate constructions, and equivalents may be employed without departing from the true spirit and scope of the invention. Therefore, the above description and illustrations should not be construed as limiting the scope of the invention which is defined by the appended claims.

What is claimed is:

1. An improved radiant vessel passive cooling system for liquid-metal poor-type modular nuclear reactors having a reactor vessel and a surrounding containment vessel spaced apart from said reactor vessel to form a first interstitial region containing an inert gas, the improvement comprising:

a shell spaced apart from and surrounding said containment vessel to form a second interstitial region comprising a circulatory air passage, said circulatory air passage having an air inlet at a first position and an air outlet at a second position which is vertically higher than said first position, said second interstitial region lying between said shell and said containment vessel; and surface area extension means in said shell longitudinally disposed from said shell into said second interstitial region towards said containment vessel to receive thermal radiation from said containment vessel, said surface area extension means spaced apart from the external surface of said containment vessel whereby heat radiated from said containment vessel is received at said surface extension means for convection, conduction and radiation to air in said circulatory passage.

2. The cooling system of claim 1, wherein said surface area extension means comprises longitudinal extending radially and inwardly directed fins to and toward said containment vessel, disposed along the interior surface of said shell.

3. The cooling system of claim 1, wherein said surface area extension means comprises a plurality of channel strips which are generally V-shaped in cross-section, and are longitudinally mounted along the interior walls of said shell to extend to and toward said containment vessel.

4. The cooling system of claim 1, where said surface area extension means comprises a corrugated insert formed by a pleated strip longitudinally installed within and in thermal contact with said shell, said corrugated insert extending to and toward said containment vessel.

5. An improved passive cooling system for sodium or sodium-potassium cooled pool-type modular nuclear reactors having a primary vessel and a surrounding secondary containment vessel spaced apart from said primary vessel to form a first interstitial region impregnated with an inert gas; the improvement comprising:

a shell spaced apart from and surrounding said containment vessel to form a second interstitial region between said containment vessel and said shell, said shell further comprising an air inlet at a first position and an air outlet at a second position which is vertically higher than said first position; and longitudinal, radially and inwardly extending fins spaced along the interior surface of said shell to project into said second interstitial region towards said containment vessel to form an extended surface for receiving radiation from said containment vessel whereby heat radiated from said containment vessel is received at said longitudinal, radial and inwardly extending fins for convection, conduction, and radiation to air in said second interstitial region.

* * * * *